US010557456B2

(12) United States Patent
Kjær et al.

(10) Patent No.: US 10,557,456 B2
(45) Date of Patent: Feb. 11, 2020

(54) POWER-RAMPING PITCH FEED-FORWARD (71) Applicant: VESTAS WIND SYSTEMS A/S, Aarhus N (DK)

(72) Inventors: Martin Ansbjerg Kjær, Harlev J (DK); Carsten Nørlund Thomsen, Langå (DK); Robert Bowyer, London (GB); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 520 days.

(21) Appl. No.: 15/039,769

(22) PCT Filed: Nov. 27, 2014

(86) PCT No.: PCT/DK2014/050403
§ 371 (c)(1),
(2) Date: May 26, 2016

(87) PCT Pub. No.: WO2015/078478
PCT Pub. Date: Jun. 4, 2015

(65) Prior Publication Data
US 2017/0022972 A1 Jan. 26, 2017

(30) Foreign Application Priority Data
Nov. 29, 2013 (DK) .................. 2013 70731

(51) Int. Cl.
G05D 3/12 (2006.01)
G05D 5/00 (2006.01)
(Continued)

(52) U.S. Cl.
CPC ......... F03D 7/0224 (2013.01); F03D 1/0675 (2013.01); F03D 7/0296 (2013.01);
(Continued)

(58) Field of Classification Search
CPC ...... F03D 1/0675; F03D 7/0224; F03D 7/028; F03D 7/0296; F03D 7/043; F03D 7/047;
(Continued)

(56) References Cited

U.S. PATENT DOCUMENTS

2003/0151259 A1    8/2003  Feddersen et al.
2008/0206051 A1*   8/2008  Wakasa ................ F03D 7/0224
                                                  416/41
(Continued)

FOREIGN PATENT DOCUMENTS

CN    1940289 A    4/2007
EP    1672778 A2   6/2006
(Continued)

OTHER PUBLICATIONS

International Serach Report for PCT/DK2014/050403, dated Mar. 16, 2015.
(Continued)

Primary Examiner — Zhipeng Wang
(74) Attorney, Agent, or Firm — Patterson + Sheridan, LLP (57) ABSTRACT Embodiments of the present disclosure generally relate to apparatus and methods for preventing power dips associated with power ramping in wind turbines. One embodiment of the present disclosure provides a method for stabilizing power output in a wind turbine, which includes tracking a rate of change in an external reference, such as an external power reference or external torque reference, computing a feed-forward pitch angle adjustment according to the rate of change in the external power reference, and sending the feed-forward pitch angle adjustment to the wind turbine to adjust a pitch angle of rotor blades simultaneously with adjusting power output according to the external reference.

18 Claims, 9 Drawing Sheets (51) Int. Cl.
- *G05D 9/00* (2006.01)
- *G05D 11/00* (2006.01)
- *G05D 17/00* (2006.01)
- *F03D 7/02* (2006.01)
- *F03D 1/06* (2006.01)
- *F03D 7/04* (2006.01)
- *G05B 19/406* (2006.01)

(52) U.S. Cl.
CPC ........... F03D 7/047 (2013.01); G05B 19/406 (2013.01); *F05B 2270/1033* (2013.01); *G05B 2219/2619* (2013.01)

(58) Field of Classification Search
CPC .. F03D 9/003; F03D 9/255; F05B 2270/1033; F05B 2270/309; G05B 19/406; G05B 2219/2619; Y02E 10/723; Y02E 10/721
See application file for complete search history.

(56) References Cited

U.S. PATENT DOCUMENTS

| | | | | |
|---|---|---|---|---|
| 2011/0049903 A1* | 3/2011 | Jorgensen | ............ | F03D 7/0224 290/55 |
| 2011/0291414 A1 | 12/2011 | Arinaga et al. | | |
| 2012/0306203 A1* | 12/2012 | Drossel | ................. | F03D 7/0284 290/44 |
| 2013/0195653 A1 | 8/2013 | Hayashi et al. | | |
| 2014/0152010 A1* | 6/2014 | Larsen | ...................... | F03D 7/00 290/44 |
| 2015/0005966 A1* | 1/2015 | Gerber | .................... | F03D 7/042 700/287 |
| 2015/0056072 A1* | 2/2015 | Perley | .................... | F03D 7/0288 416/1 |
| 2015/0132129 A1* | 5/2015 | Atzler | .................. | F03D 7/0224 416/1 |

FOREIGN PATENT DOCUMENTS

| | | |
|---|---|---|
| EP | 1719910 A1 | 11/2006 |
| EP | 1770278 A2 | 4/2007 |
| EP | 2025929 A2 | 2/2009 |
| EP | 2520795 A1 | 11/2012 |
| WO | 2013/046193 A2 | 4/2013 |

OTHER PUBLICATIONS

Danish Search Report for PA 2013 70731, dated Aug. 12, 2014.
SIPO Notification of the First Office Action for Application No. 201480071603.9 dated Feb. 24, 2018.

* cited by examiner

POWER-RAMPING PITCH FEED-FORWARD

BACKGROUND

Field

Embodiments of the present disclosure provide apparatus and methods for controlling wind turbines. Particularly, embodiments of the present disclosure provide apparatus and methods for preventing power dips in wind turbines during rapid power ramping or torque ramping.

Description of the Related Art

To meet demands for stabilization in a power grid, wind turbines in the power grid are expected to provide fast changes in active power. For example, power ramping of about 10% of maximum capacity per second both upwards and downwards may be needed in active wind power platforms. However, as ramping rate requirement in power grids increases, power dips may occur during rapid power ramping causing instability problems in the power grid.

Figure 1:
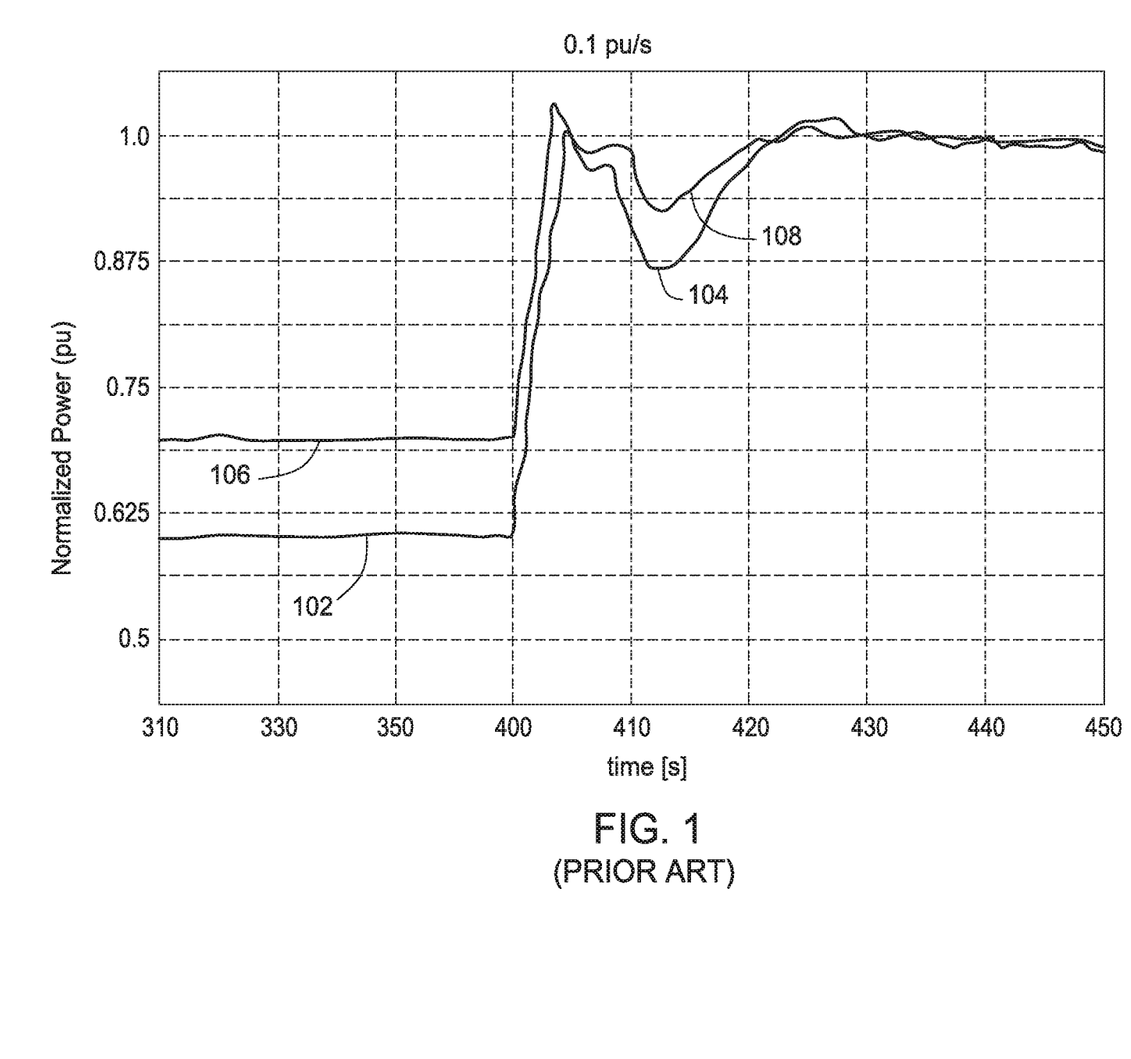
FIG. 1 is a schematic graph showing power dips following rapid power ramping.

FIG. 1 is a schematic graph showing power dips following rapid power ramping with large ramp amplitude under extreme circumstances. The x-axis of FIG. 1 denotes time in seconds and the y-axis denotes the normalized power output in p.u. (per unit) of a wind turbine. Curve 102 represents a schematic power output—time graph associated with a 0.4 p.u. power ramping at a rate of about 0.1 p.u. per second. The curve 102 has a dip 104 after a ramping period starts at 400 seconds. The dip 104 indicates a dip in power output of the wind turbine after the ramping period. Curve 106 is a power output—time graph associated with a 0.3 p.u. power ramping at a rate of about 0.1 p.u. per second. The curve 106 has a dip 108 after the ramping period. The dip 108 indicates a dip in power output of the wind turbine after the ramping period. As illustrated in FIG. 1, power dips may occur after rapid power ramping causes instability in the power grid. The observed power dip is an inherent problem of conventional wind turbine controllers.

Therefore, there is need for apparatus and methods to improve power output stability after power ramping in wind turbines.

SUMMARY

Embodiments of the present disclosure generally relate to apparatus and methods for preventing power dips associated with power ramping in wind turbines.

One embodiment of the present disclosure provides a method for stabilizing power output in a wind turbine. The method includes tracking a rate of change in an external reference, computing a feed-forward pitch angle adjustment based on the rate of change in the external reference, and sending the feed-forward pitch angle adjustment to the wind turbine to adjust a pitch angle of rotor blades. In this way, the adjustment of the pitch angle may be done simultaneously with adjusting power output according to the external reference.

Another embodiment of the present disclosure provides a pitch controller for a wind turbine. The pitch controller includes a feed-forward controller configured to receive an external reference from a grid controller and send a feed-forward pitch angle adjustment to the wind turbine, and a feed-back controller configured to receive a feed-back signal from a sensor in the wind turbine and generate a feed-back pitch angle adjustment according to the feed-back signal.

Another embodiment of the present disclosure provides a wind turbine system. The wind turbine system includes a wind turbine configured to convert wind power to electrical power and provide electrical power to a power grid, a feed-forward controller configured to receive an external reference from a grid controller of the power grid and send a feed-forward pitch angle adjustment to the wind turbine, and a feed-back controller configured to receive a feed-back signal from a sensor in the wind turbine and generate a feed-back pitch angle adjustment according to the feed-back signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure generally relate to apparatus and methods for preventing power dips during power ramping in wind turbines. One embodiment of the present disclosure includes a feed-forward controller configured to monitor changes in an external reference and send feed-forward pitch changes in response to the changes in the external reference. The feed-forward controller may be used to ensure that blades of wind turbines are pitched to increase power intake from the wind according to an increase in an external reference as soon as the increase in the external reference is received at the wind turbine, thus, preventing subsequent power dips and improving power grid stability. The feed-forward controller may be an individual module or integrated with an existing controller in a wind turbine. The external reference may be an external power reference or an external torque reference.

FIG. 1 is a schematic graph showing power dips following rapid power ramping as known in the art. FIG. 1 has already been discussed in the section Description of the related art.

Figure 2:
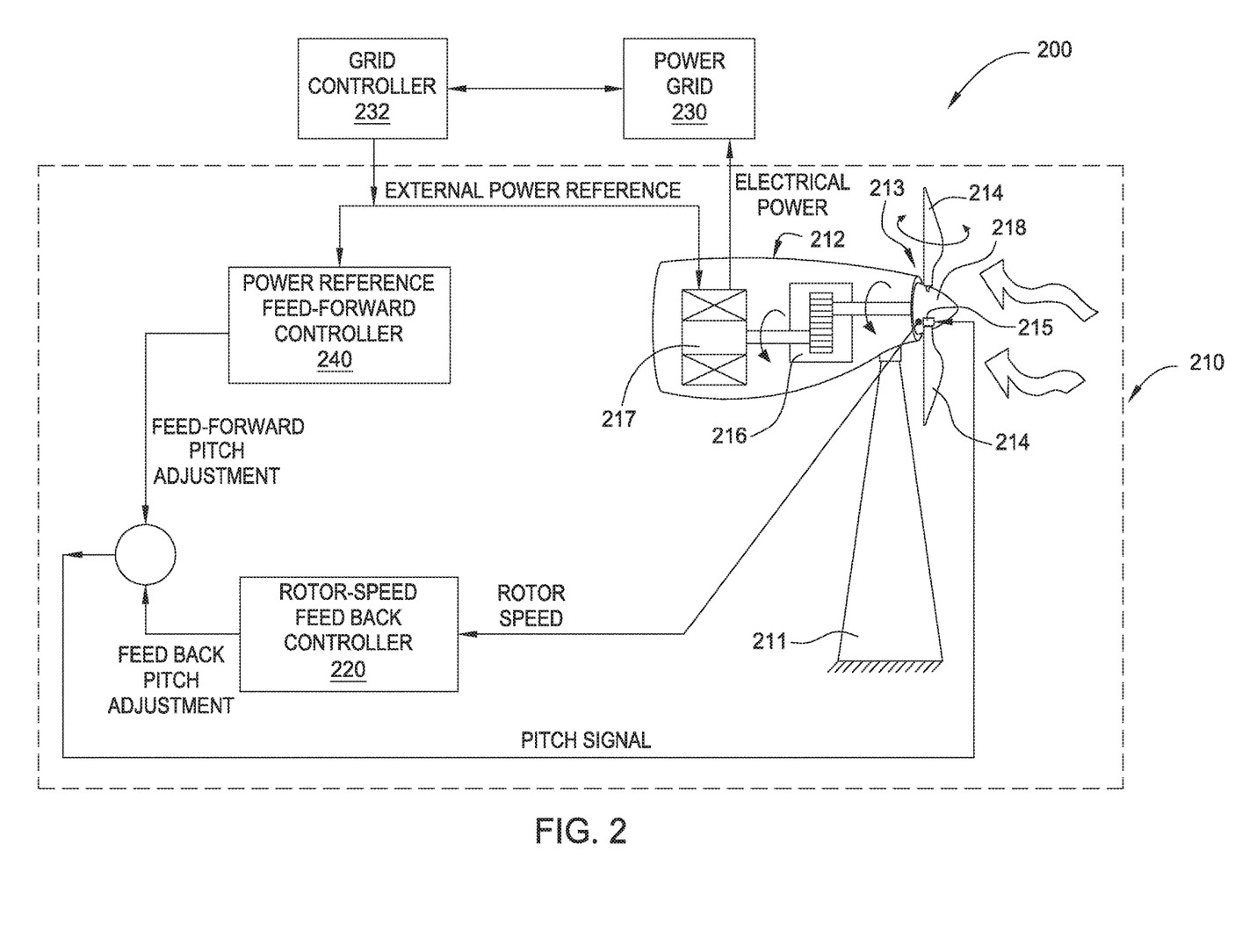
FIG. 2 is a schematic diagram showing architecture of a wind turbine system according to one embodiment of the present disclosure.

FIG. 2 is a schematic diagram showing the architecture of a wind turbine system 200 according to one embodiment of the present disclosure. The wind turbine system 200 includes a wind turbine 210 for harvesting wind power and converting wind power to electrical power. The wind turbine 210 may be connected to a power grid 230 and transfer electrical power to the power grid 230. The level of power output from the wind turbine 210 to the power grid 230 is controlled by an external power reference generated by a grid controller 232. The grid controller 232 may e.g. be one of a unit located inside the wind turbine 210, a plant controller in a centralized unit for controlling multiple turbines, or a mechanism located outside the wind farm directly from the grid operator's system.

The wind turbine 210 according to an embodiment of the present disclosure may include a rotor-speed feedback controller 220 and a power reference feed-forward controller 240. The wind turbine 210 generally includes a tower 211, a nacelle 212, and a rotor 213. The tower 211 raises the nacelle 212 and the rotor 213 to an elevation so that the rotor 213 may rotate without obstruction and may be exposed to a higher wind speed at the elevation. The rotor 213 may include a hub 218 and rotor blades 214 mounted on the hub 218. The rotor blades 214 may have an aerodynamic profile such that, at predefined wind speeds, the rotor blades 214 experience lift causing the hub 218 to rotate. A gear box 216 and a generator 217 may be disposed in the nacelle 212. The rotor 213 may be coupled to the generator 217 through the gear box 216. Kinetic energy in the form of rotation of the rotor 213 is transferred to the generator 217, where the kinetic energy is converted to electrical energy. A portion or all the power may be passed through a converter before supplied to the power grid 230 from the generator 217.

In one embodiment, the wind turbine 210 may be a pitch controlled wind turbine. In a pitch controlled wind turbine, the amount of wind power intake is determined by a pitch angle between a rotor blade and an incoming wind. A pitch actuator 215 may be coupled to the rotor blades 214 to adjust a pitch angle of the rotor blades 214. The pitch angle may be adjusted to tune the amount of wind power intake by the rotor blades 214, thus the power output of the wind turbine system 200.

The rotor-speed feedback controller 220 provides a pitch adjustment signal to the rotor blades 214 according to a feedback signal from the rotor 213, for example the rotational speed of the rotor 213. During operation, it is generally desirable to maintain a constant rotational speed. The rotor 213 generally rotates at a predetermined rotor speed at various levels of power output, for example various levels of power output dictated by the external power reference. During operation, the rotor-speed feedback controller 220 receives a rotor speed signal indicating the rotational speed of the rotor 213 from one or more sensors in the wind turbine 210. The rotor-speed feedback controller 220 may compare the actual rotor speed with predetermined rotor speed and calculate a rotor speed error. If the rotor speed error is larger than a threshold value, the rotor-speed feedback controller 220 may send a feedback pitch adjustment to the rotor 213 to correct the error. The rotor-speed feedback controller 220 may be any suitable closed loop controller, such as a PID controller, a PI controller or the like.

The power reference feed-forward controller 240 provides a feed-forward pitch adjustment signal to the rotor blades 214 according to the external power reference from the grid controller 232. The power reference feed-forward controller 240 receives and monitors the external power reference for any changes in the external power reference. When the feed-forward controller 240 determines that there is a change in the external power reference, for example a rapid increase or a rapid decrease in the desired power outputted from the turbine 210, the feed-forward controller 240 generates a feed-forward pitch adjustment and sends a feed-forward pitch adjustment signal to the wind turbine 210. When the external power reference changes, the feed-forward pitch adjustment signal and the external power reference arrive at the wind turbine 210 simultaneously so that the wind turbine 210 reacts to the change in the external power reference, for example adjusting the pitch angle, before the change in the external power reference can result in any rotor speed errors that can cause instability in the power output.

The power reference feed-forward controller 240 provides a fast reaction to changes in external power reference in the wind turbine system 200. The power reference feed-forward controller 240 is triggered by changes in external power reference and does not impose any changes to normal steady operation of the wind turbine system 200. The power reference feed-forward controller 240 may be any suitable feed-forward controller that tracks changes of external power reference and calculates feed-forward adjustment of rotor pitch angle.

Figure 3:
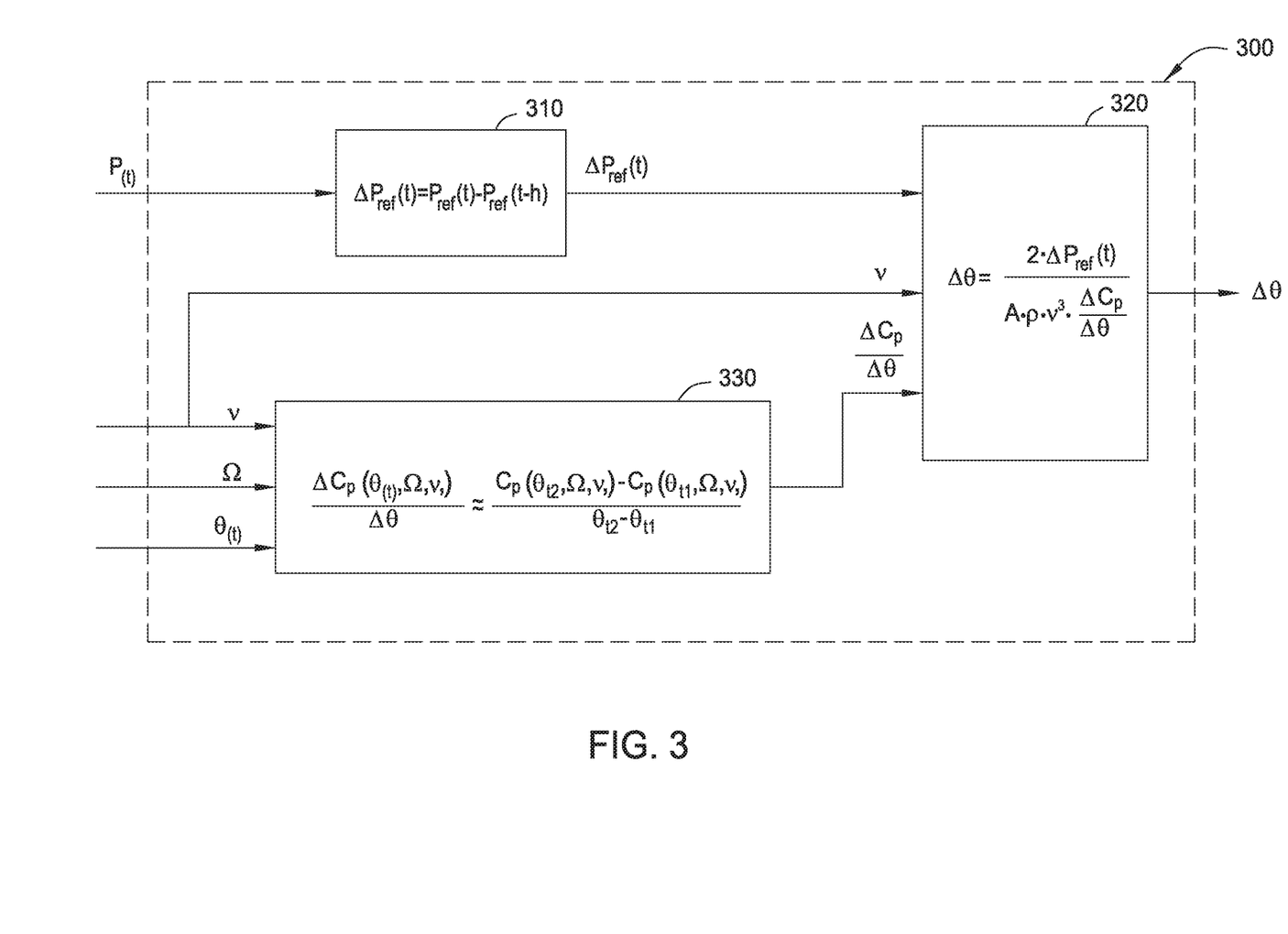
FIG. 3 is a schematic diagram of a feed-forward controller according to one embodiment of the present disclosure.

FIG. 3 is a schematic diagram of a feed-forward controller 300 according to one embodiment of the present disclosure. The feed-forward controller 300 provides a feed-forward adjustment using numeric differentiation of a wind turbine power equation. The feed-forward controller 300 may be used in place of the power reference feed-forward controller 240 of FIG. 2.

The feed-forward controller 300 includes a block 310 where the external power reference is monitored by sampling at predetermined time intervals and the change in the external power reference is calculated during each time interval. The change in external power reference may be calculated by:

$$\Delta P_{ref}(t) = P_{ref}(t) - P_{ref}(t-h) \qquad \text{Equation 1}$$

where t denotes time, h denotes sampling time interval, $P_{ref}(t)$ denotes the value of the external power reference at the current sampling time interval, $P_{ref}(t-h)$ denotes the value of the external power reference during the immediate prior sampling time interval, and $\Delta P_{ref}(t)$ denotes the change in external power reference at the current sampling time interval. The change in external power reference $\Delta P_{ref}(t)$ is then forwarded to a block 320 where a feed-forward pitch adjustment may be calculated.

The static power output of a wind turbine may be calculated by:

$$P = \frac{1}{2} \cdot A \cdot \rho \cdot v^3 \cdot C_p(\theta, \Omega, v) \qquad \text{Equation 2}$$

where P denotes the power output of a wind turbine, A denotes the sweeping area of the wind turbine's rotor blades, $\rho$ denotes the air density, $\theta$ denotes the pitch angle of the rotor blades, $\Omega$ denotes the rotor speed, v denotes the wind speed, and $C_p(\theta,\Omega,v)$ indicates the power coefficient of the wind turbine, which is usually a function of pitch angle $\theta$, rotor speed $\Omega$ and wind speed v.

According to one embodiment of the present disclosure, a feed-forward pitch adjustment may be calculated using a numerical differentiation of Equation 2. First, applying differentiation with respect to the pitch angle $\theta$ on both sides of Equation 2 to obtain the following:

$$\frac{\Delta P}{\Delta \theta} = \frac{1}{2} \cdot A \cdot \rho \cdot v^3 \cdot \frac{\Delta C_p(\theta, \Omega, v)}{\Delta \theta} \qquad \text{Equation 3}$$

Equation 3 includes change in power output $\Delta P$ and change in pitch angle $\Delta \theta$. Here differentiation is denoted by use of the difference symbol Δ, it is however to be understood that other signs may be used to denote differentiations, such as d and ∂, possibly depending on the specific type of differentiation. No limitation can be inferred from the specific notation used.

Equation 3 is inverted to get change in pitch angle over change in power output:

$$\frac{\Delta\theta}{\Delta P} = \frac{2}{A \cdot \rho \cdot v^3 \cdot \frac{\Delta C_p(\theta, \Omega, v)}{\Delta\theta}}$$

and further transform Equation 3 to Equation 4:

$$\Delta\theta = \frac{2 \cdot \Delta P}{A \cdot \rho \cdot v^3 \cdot \frac{\Delta C_p(\theta, \Omega, v)}{\Delta\theta}} \qquad \text{Equation 4}$$

In Equation 4, the change in pitch angle Δθ is a function of change in power output ΔP. Under Equation 4, a change in power output ΔP corresponds to a change in pitch angle Δθ when other terms in Equation 4 are provided. Accordingly, when the change in power output is set according to the change in external power reference $\Delta P_{ref}(t)$, a corresponding change in pitch angle Δθ can be calculated from Equation 4.

Generally, the sweeping area A is determined by the geometry of the wind turbine, air density ρ may be a constant or calculated according to temperature and pressure of the environment, and the pitch angle of the rotor blades θ, rotor speed Ω and wind speed v can be obtained from corresponding sensors.

The term $$\frac{\Delta C_p(\theta, \Omega, v)}{\Delta\theta}$$

in Equation 4 may be calculated numerically. In one embodiment, the term $$\frac{\Delta C_p(\theta, \Omega, v)}{\Delta\theta}$$

may be calculated by numerically solving the following Equation, for example by using one or more look-up tables:

$$\frac{\Delta C_p(\theta, \Omega, v)}{\Delta\theta} \approx \frac{C_p(\theta_{t1}, \Omega, v) - C_p(\theta_{t2}, \Omega, v)}{\theta_{t1} - \theta_{t2}} \qquad \text{Equation 5}$$

Here $\theta_{t1}$ and $\theta_{t2}$ are discrete pitch angle values closest to the current pitch angle θ, and $C_p(\theta_{t1}, \Omega, v)$ and $C_p(\theta_{t2}, \Omega, v)$ are discrete values of wind turbine power coefficient corresponding to pitch angles $\theta_{t1}$ and $\theta_{t2}$ with rotor speed Ω and wind speed v. In one embodiment, $C_p(\theta_{t1}, \Omega, v)$ and $C_p(\theta_{t2}, \Omega, v)$ may be obtained from a look-up table. In one embodiment, a look-up table with array of values of $C_p(\theta, \Omega, v)$ may be established empirically for an individual wind turbine.

As shown in FIG. 3, for a given condition, including the pitch angle of rotor blades θ, rotor speed Ω and wind speed v, the term $$\frac{\Delta C_p(\theta, \Omega, v)}{\Delta\theta}$$

may be calculated in block 330 using Equation 5. The calculated term $$\frac{\Delta C_p(\theta, \Omega, v)}{\Delta\theta}$$

is then sent to block 320 where a pitch angle adjustment Δθ may be calculated using Equation 4 for a change in external power reference $\Delta P_{ref}(t)$ measured in block 310. The pitch angle adjustment Δθ can then be sent to a pitch controller so that the pitch angle of the rotor blades can be adjusted with power ramping without encountering a rotor speed error large enough to trigger any pitch angle adjustment as in conventional wind turbine controllers, thus, avoiding any delayed power dips—e.g., the power dips shown in FIG. 1.

According to one embodiment Equation 2 is approximated by $$P(\rho, \theta, \Omega, v) \approx P_{r0}(\rho) + \frac{\partial P}{\partial \theta}(\theta - \theta_0) + \frac{\partial P}{\partial \omega}(\Omega - \Omega_0) + \frac{\partial P}{\partial V}(v - v_0) \qquad \text{Eq. 6}$$

In this manner, the feed-forward pitch angle is computed taking into account the rotor speed (Ω), thereby taking into account that by changes in the power reference, will affect the rotor speed. Moreover, also wind speed variation during the ramping is taken into account in Equation 6. However such wind speed variations independent of the change of power and are typically small. The inclusion of rotor speed in the feed-forward pitch contribution increases the precision of the feed-forward pitch angle adjustment.

$$J\frac{d\Omega}{dt}\Omega = P - P_g,$$

Basic rotor speed dynamic gives: by neglecting power losses, $P_g$ is the power extracted by the generator or the grid power.

By differentiating this equation with time and inserting Equation 6, the following expression is obtained:

$$\frac{d}{dt}\left(J\frac{d\Omega}{dt}\Omega\right) = \frac{\partial P}{\partial \theta}\frac{d\theta}{dt} + \frac{\partial P}{\partial \Omega}\frac{d\Omega}{dt} + \frac{\partial P}{\partial v}\frac{dv}{dt} - \frac{dP_g}{dt} \qquad \text{Equation 7}$$

Here speed values and power changes at the generator can be measured, power changes in dependence on pitch variation, speed variation and wind speed variation can be determined from look-up tables or equivalent means. Thus by isolating the term $$\frac{d\theta}{dt},$$

the feed-forward pitch angle adjustment is given.

Returning to FIG. 3 block 320, Δθ, can be expressed as dθ, as obtained from Equation 7.

It is known that changes in the pitch angle gives a change of induction and it will take some time before the induction is stabilized at a certain value. This is normally referred to as induction lag, or dynamic inflow. Due to this behavior a decrease in pitch angle will give a short boost in torque followed by a settling period towards equilibrium for the wind field.

In an embodiment, the induction lag behavior on torque or power can be modelled by a lead compensator (filter which amplifies frequencies above a certain frequency threshold) on the pitch angle. This filter needs to be inverted if the pitch is to be found as a function of power or torque changes. This results in a filter type that can be described as a lag compensator. The feed-forward pitch angle can be compensated for induction lag by filtering using a lag compensator, that is by applying a lag compensator filter to $$\frac{d\theta}{dt}.$$

The lag compensator filter could be tuned for different operating points of the turbine. Induction lag compensation may advantageously be used at high pitch rates caused by high power rates.

Figure 4A:
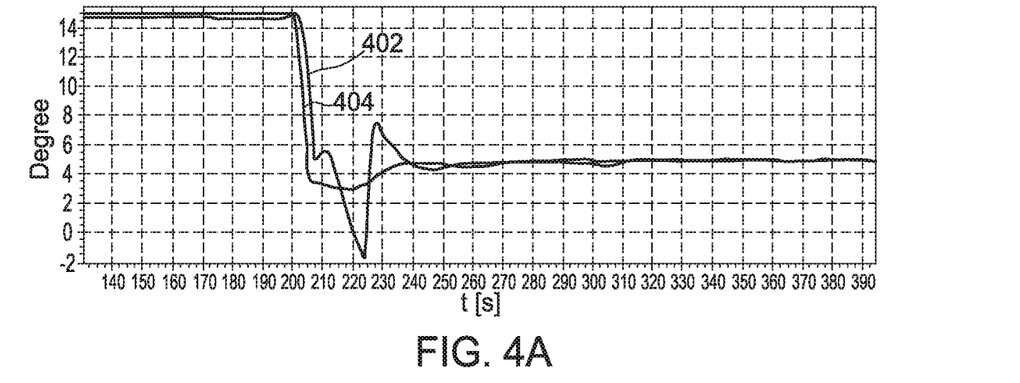
FIGS. 4A-4C are simulation results of a feed-forward controller according to embodiments of the present disclosure.
Figure 4B:
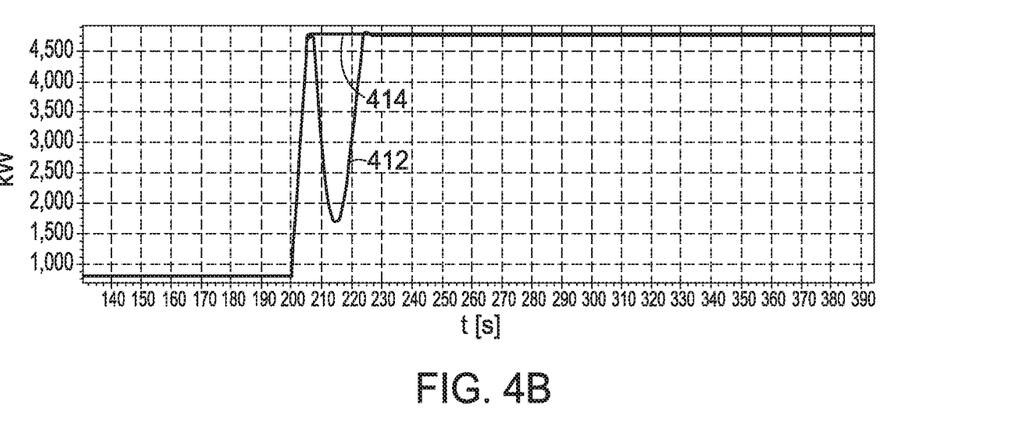
Figure 4C:
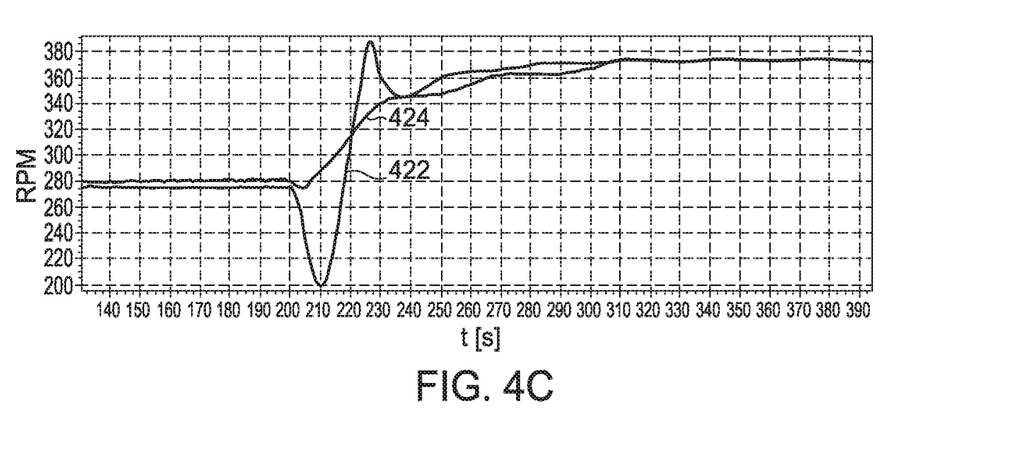

FIGS. 4A-4C are graphs showing simulation results of a wind turbine with a feed-forward controller according to one embodiment of the present disclosure and a traditional wind turbine without any feed-forward controller. In the simulation, both the traditional wind-turbine and the wind turbine with the feed-forward controller perform a power ramp up from about 800 kilowatt to about 4800 kilowatt between time equals 200 seconds and time equals 205 seconds. The feed-forward controller may be similar to the feed-forward controller 300 described above.

FIG. 4A includes graphs of pitch angle versus time of the wind turbines. Curve 402 is the pitch angle versus time graph of the traditional wind turbine. Curve 404 is the pitch angle versus time graph of the wind turbine with the feed-forward controller. As shown in FIG. 4A, the wind turbine with the feed-forward controller encounters much smaller and smoother pitch angle adjustments after the power ramp up compared to the conventional wind turbine FIG. 4B includes graphs of power output versus time of the wind turbines. Curve 412 is the power output versus time graph of the traditional wind turbine. Curve 414 is the power output versus time graph of the wind turbine with the feed-forward controller. As shown in FIG. 4B, the wind turbine with the feed-forward controller does not encounter any power dip during or after the power ramp while the traditional wind turbine encounters a power dip of about 3000 kilowatts.

FIG. 4C includes graphs of generator speed versus time of the wind turbines. Curve 422 is the generator speed versus time graph of the traditional wind turbine. Curve 424 is the generator speed versus time graph of the wind turbine with the feed-forward controller. As shown in FIG. 4C, the wind turbine with the feed-forward controller encounters much smaller and smoother generator speed changes during and after the power ramp up compared to the traditional wind turbine.

FIGS. 4A-4C demonstrate that a feed-forward controller according to an embodiment of the present disclosure reduces power dips and other instabilities associated with change in power output. The improvement in stabilities of pitch angle, power output and generator speed may be attributed to the feed-forward controller's shortened reaction time to power ramping. The feed-forward controller invokes a pitch angle change when observing the change in external power reference, while the conventional wind turbine controller only adjusts pitch angle when there is a large enough speed error accumulated in the wind turbine.

FIGS. 4A to 4C are based on an embodiment using Equation 4. By basing the output power on a feed-forward pitch angle adjustment using Equation 7, the generator speed changes seen in FIG. 40 can be taken into account to even further stabilize the power output.

Figure 5:
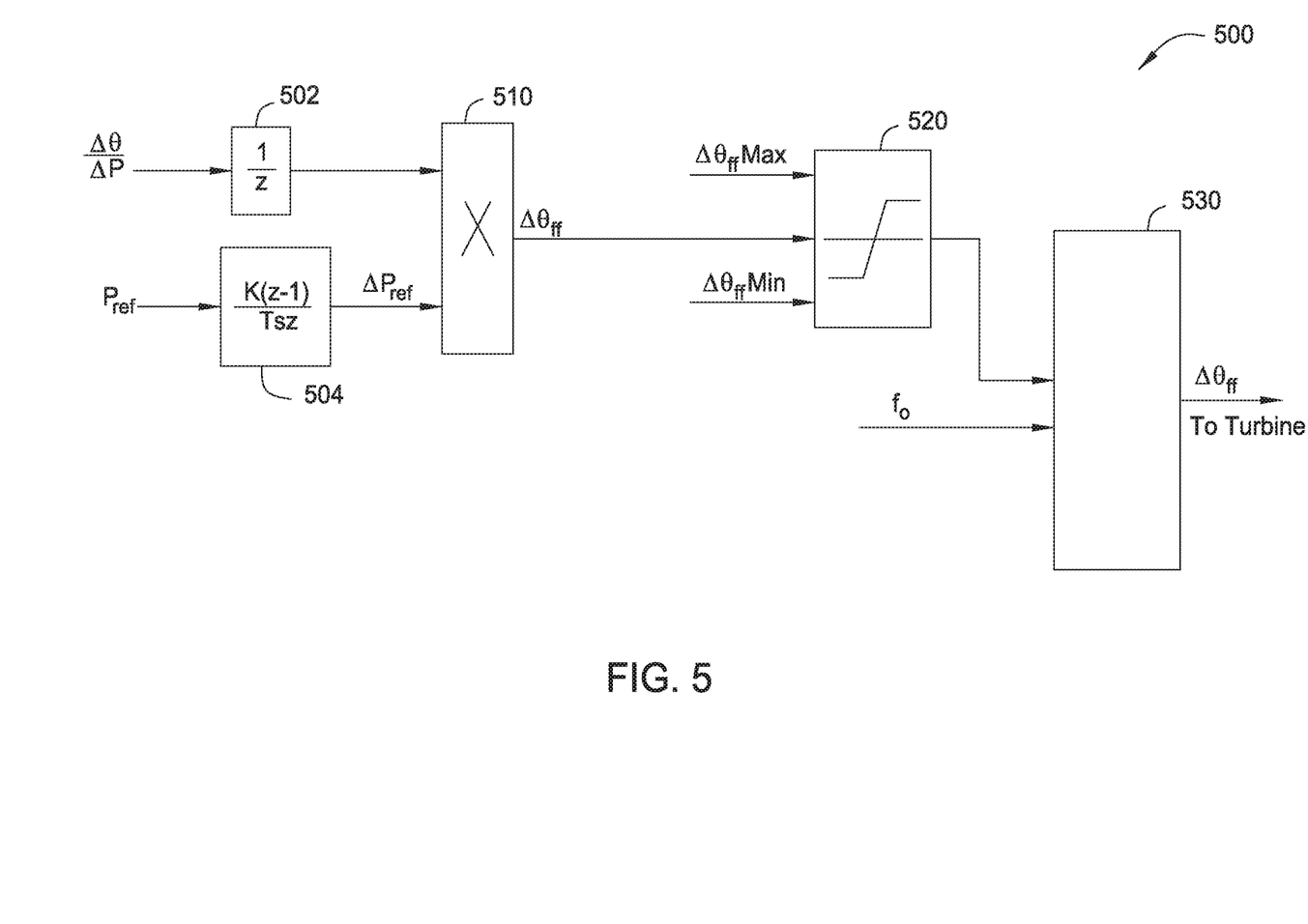
FIG. 5 is a block diagram of a feed-forward controller according to another embodiment of the present disclosure.

FIG. 5 is a block diagram of a feed-forward controller 500 according to another embodiment of the present disclosure. The feed-forward controller 500 provides an implementation of a feed-forward pitch angle adjustment using resources from the existing control system without interference with turbine operation. The feed-forward controller 500 may be used with an existing wind turbine controller. If a compensation term $$\frac{\Delta P}{\Delta \theta}$$

is already calculated from the average pitch angle, for example by an existing turbine controller, the compensation term $$\frac{\Delta P}{\Delta \theta}$$

may be inverted and used to compute a feed-forward pitch angle adjustment.

As shown in FIG. 5, the compensation term $$\frac{\Delta P}{\Delta \theta}$$

from an existing non-linear load controller is inverted to $$\frac{\Delta \theta}{\Delta P},$$

the term of change in pitch angle over change in power output, and then fed to a multiplier 510 through a unit delay 502, and the external power reference $P_{ref}$ is fed into the multiplier 510 through a discrete derivative 504. The multiplier 510 outputs a rate of pitch angle forward-feed adjustment $\Delta \theta_{ref}$.

In one embodiment, the rate of pitch angle feed-forward adjustment $\Delta \theta_{ff}$ may be fed into a saturation 520 to ensure that the rate of pitch angle feed-forward adjustment $\Delta \theta_{ff}$ is within the scope between a maximum rate of pitch angle adjustment $\Delta \theta_{ff}$Max and a minimum rate of angle adjustment $\Delta \theta_{ff}$Min. The saturation 520 provides protection to the wind turbine by limiting the rate of pitch angle adjustment from the feed-forward controller 500 within the operational range of the wind turbine.

In one embodiment, the feed-forward controller 500 may further include a notch filter 530. The notch filter 530 may be a notch filter at the natural frequency $f_0$ of the wind turbine components, such as the wind turbine tower, the blades, to prevent vibrating the wind turbine tower when adjusting pitch angle. The notch filter 530 may reduce fatigue loads of the wind turbine tower considerably by avoid adjusting pitch angle at frequencies matching the natural frequency of the wind turbine components. In one embodiment, the notch filter 530 may be a second order notch filter.

Figure 6A:
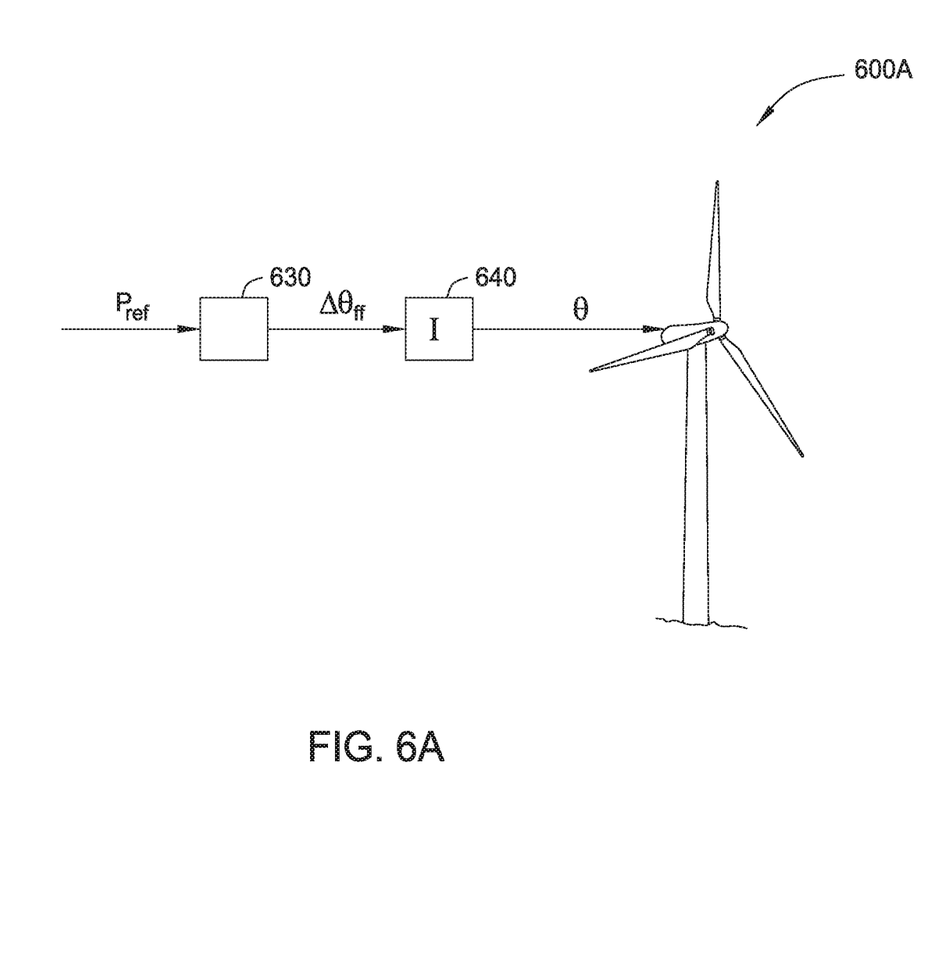
FIGS. 6A-6D are schematic diagrams of feed-forward controllers according to embodiments of the present disclosure.

FIGS. 6A-6D are schematic diagrams of feed-forward controllers according to embodiments of the present disclosure. FIG. 6A is a schematic diagram of a wind turbine system 600A having a feed-forward controller 630 connected to a wind turbine 602 through an integral controller 640.

The feed-forward controller 630 may track a change in an external power reference $P_{ref}$ and calculate a feed-forward pitch angle adjustment $\Delta\theta_{ff}$ according to the change in the external power reference. The feed-forward controller 630 may calculate the feed-forward pitch angle adjustment $\Delta\theta_{ff}$ by numerically solving Equation 4 or Equation 7, as discussed above in reference to the feed-forward controller 300. Alternatively, the feed-forward controller 630 may calculate the feed-forward pitch angle adjustment $\Delta\theta_{ff}$ using a compensation term $$\frac{\Delta P}{\Delta \theta}$$

from a typical controller of a wind turbine as described above in reference to the feed-forward controller 500.

The feed-forward pitch angle adjustment $\Delta\theta_{ff}$ from the feed-forward controller 630 may be fed to the integral controller 640 where a control signal of a new pitch position θ is generated by integrating pitch angle adjustment $\Delta\theta_{ff}$ over time. The new pitch angle position θ is sent to the wind turbine 602 before any power dips occurs due to the change in the external power reference $P_{ref}$.

Figure 6B:
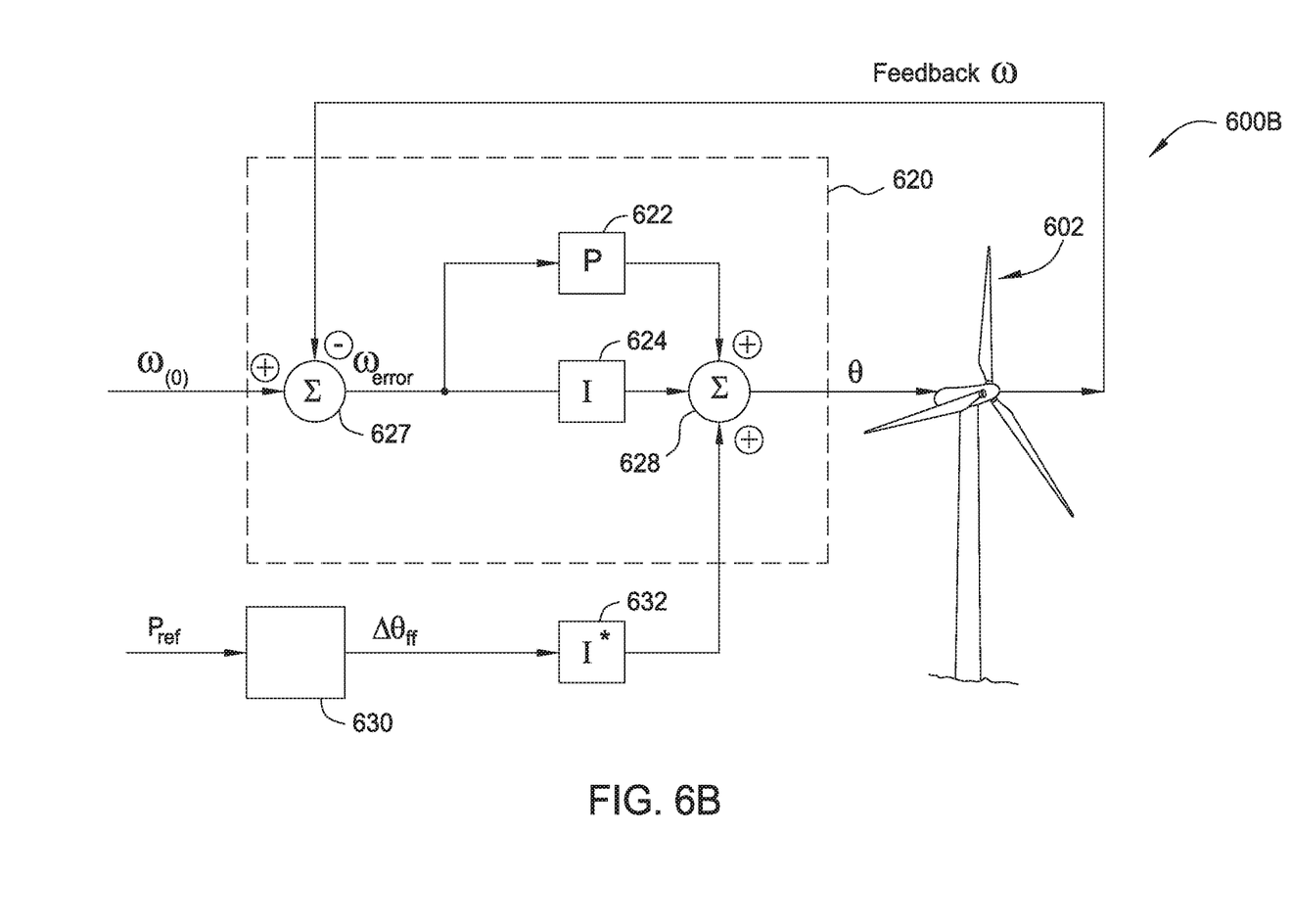

FIG. 6B is a schematic diagram of a wind turbine system 600B having a feed-forward controller integrated within an existing control system. The wind turbine system 600B includes the wind turbine 602. The wind turbine 602 may be controlled by a feed-back controller 620. The feed-back controller 620 may control various parameters, such as pitch angle position, of the wind turbine 602. For example, the feed-back controller 620 may be a pitch controller.

The feed-back controller 620 may be any suitable controller that operates with wind turbines. In the exemplary embodiment of FIG. 6B, the feed-back controller 620 is a PI controller having a proportional controller 622, an integral controller 624 and adders 627, 628. The adder 627 receives a set pitch rotation rate $\omega_0$ and a feedback pitch rotation rate ω as input, and calculates an pitch rotation rate error $\omega_{error}$. The adder 627 sends the pitch rotation rate error $\omega_{error}$ to the proportional controller 622 and the integral controller 624 where corresponding adjustment terms are generated. The adder 628 receives the adjustment terms from the proportional controller 622 and the integral controller 624 for generating a new pitch angle position θ.

The feed-forward pitch angle adjustment $\Delta\theta_{ff}$ from the feed-forward controller 630 may be fed to an integral controller 632 of the feed-back controller 620 where a forwardly adjusted pitch position $\theta_{ff}$ is generated by integrating pitch angle adjustment $\Delta\theta_{ff}$ over time. The integral controller 632 may be any suitable integrator, for example a leaking integrator or a normal integrator. The integral controller 632 is further connected to the adder 628 of the feedback controller 620. The adder 628 receives the forwardly adjusted pitch position $\theta_{ff}$ and combines the adjustment terms from the proportional controller 622 and the integral controller 624 to generate the new pitch angle position θ.

During normal operation, the feed-back controller 620 tracks an error $\omega_{error}$ between a set point, e.g. a set pitch rotation rate $\omega_0$, and a sensor feedback, e.g. actual pitch rotation rate co measured by a sensor on the wind turbine. The error $\omega_{error}$ was sent to the proportional controller 622 where a product of the error $\omega_{error}$ and a proportional gain is computed, and to the integral controller 624 where a product of the integral of the error $\omega_{error}$ and the integral gain is computed. A control signal, i.e., a new pitch angle position θ, is generated from the computation results of the proportional controller 622 and the integral controller 624 and sent to the wind turbine 602.

During power ramping, i.e. when there is a change in the external power reference $P_{ref}$, the feed-forward controller 630 sends a feed-forward pitch angle adjustment $\Delta\theta_{ff}$ to the integral controller 624 of the feed-back controller 620, where the feed-forward pitch angle adjustment $\Delta\theta_{ff}$ is incorporated in the control signal of pitch angle position θ. This arrangement enables the wind turbine 602 to adjust pitch angle as soon as a change in the external power reference $P_{ref}$ is received, reducing pitch angle errors caused by power ramping.

Figure 6C:
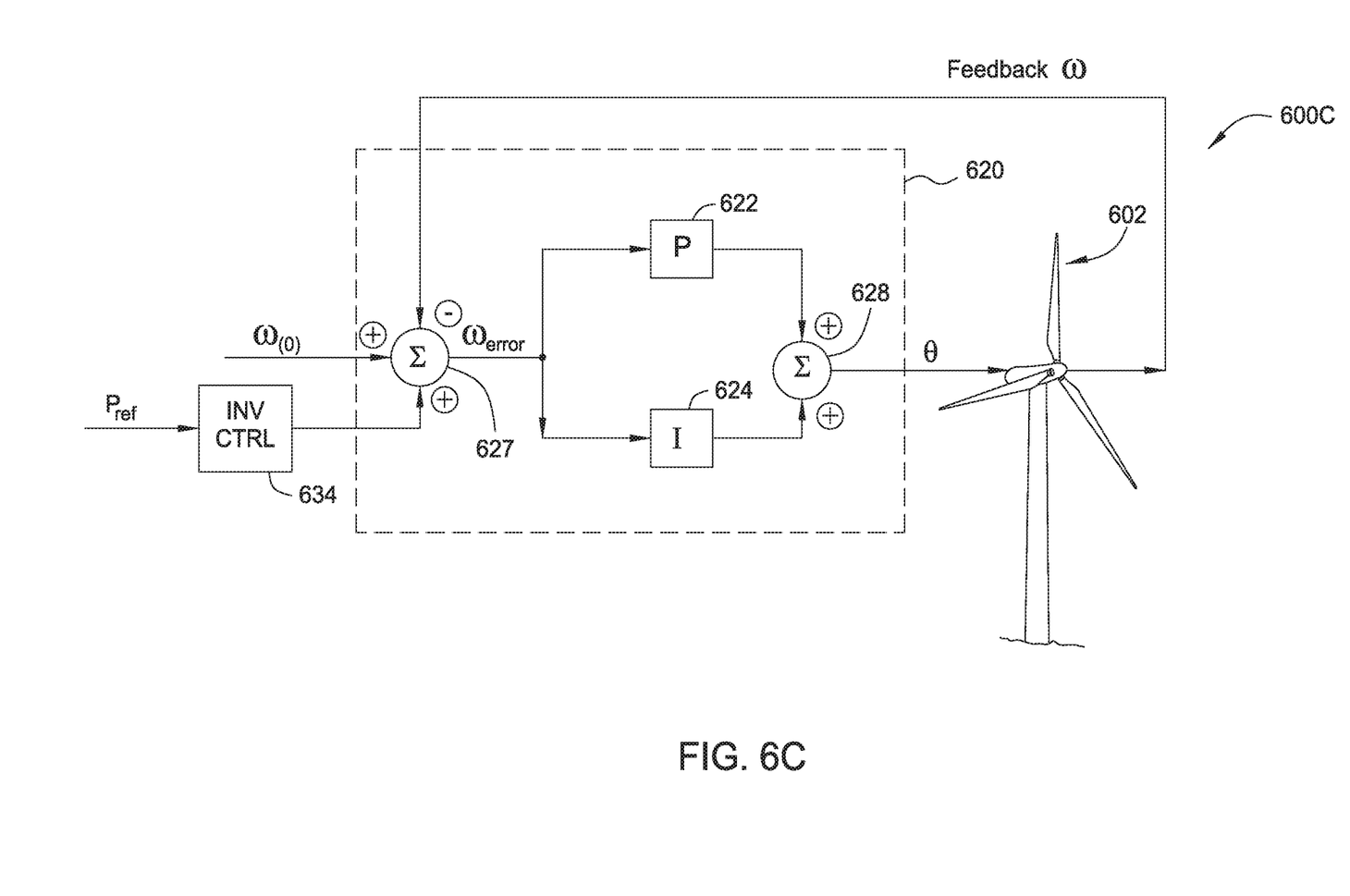

FIG. 6C is a schematic diagram of a wind turbine system 600C having a feed-forward controller integrated within an existing control system. The wind turbine system 600C includes the wind turbine 602, the feed-back controller 620 and an inverted controller 634 connected to the adder 627. The inverted controller 634 converts a rate of change in the external power reference $P_{ref}$ into a speed rate. The speed rate is then added to the adder 627 of the feed-back controller 627 as an additional rotation rate error.

Figure 6D:
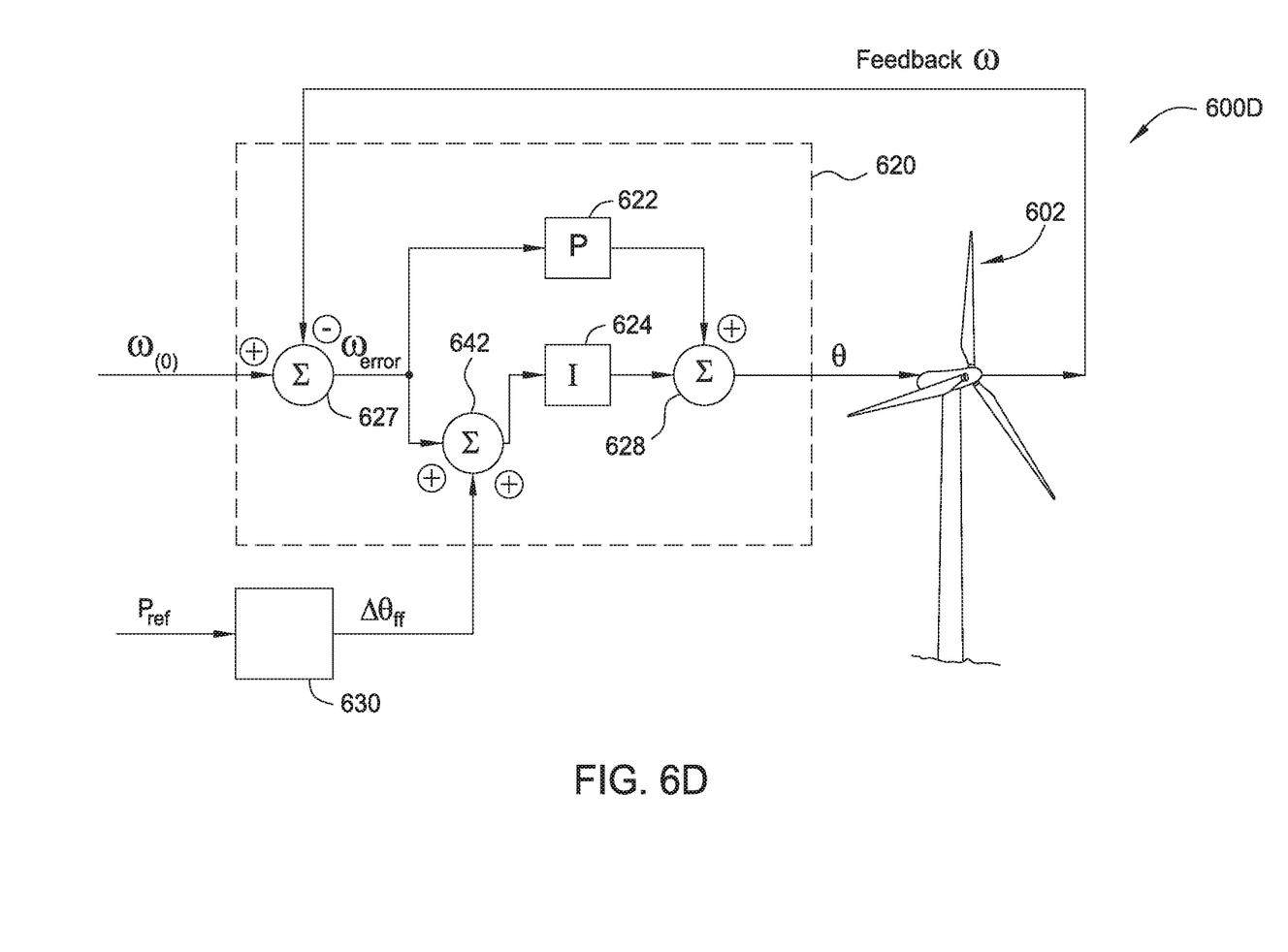

FIG. 6D is a schematic diagram of a wind turbine system 600D having a feed-forward controller integrated within an existing control system. Similar to the wind turbine system 600B in FIG. 6B, the wind turbine system 600D includes the wind turbine 602 controlled by a feed-back controller 620. The feed-forward pitch angle adjustment $\Delta\theta_{ff}$ from the feed-forward controller 630 may be fed to an adder 642 disposed between the adder 627 and the integral controller 624 of the feed-back controller 620. The adder 642 sums the error $\omega_{error}$ and the pitch angle adjustment $\Delta\theta_{ff}$ and sends the summation to the integral controller 624 wherein the summation is integrated over time to yield a combined value of the forwardly adjusted pitch position $\theta_{ff}$ and the integral gain of the error $\omega_{error}$.

By integrating with the existing control system, such as the feed-forward controller 630, embodiments of the present disclosure can avoid the need of handling leaky integrator state and rely on the existing control system for enable/disable logic. Therefore, the feed-forward pitch angle adjustment can be implemented with limited modification to existing system.

In embodiments, the feed-forward pitch angle adjustment is continuously added to the operating point (i.e. integrator) of the Full Load Controller. In other embodiments a pitch operating point can continuously be calculated, and the integrator of the controller may basically only contain the adjustment values.

Embodiments of the present disclosure have several advantages. The feed-forward controllers according to embodiments of the present disclosure allow wind turbines to ramp smoothly to new target power outputs without power dips. The feed-forward controller may be easily implemented by integrating into the existing control system of a wind turbine without requiring major changes. The feed-forward controller can be implemented in the form of a computer program product with existing hardware without additional sensors or hardware modifications. Furthermore, the feed-forward controller does not interfere with normal wind turbine operations unless a set point of power output is changed. As a result, embodiments of the present disclosure provide simple and effective solutions to improve grid stability.

Even though, embodiments of the present disclosures are described above in association with upwards power ramping, embodiments of the present disclosure may be applied to downward power ramping as well, for example to prevent turbine over speed during downward power ramping.

Even though, embodiments of the present disclosure are described above in association with controlling turbine power, embodiments of the present disclosure may be applied to control turbine torque in similar manner. For example, embodiments of the present disclosure may be used to prevent torque dips during turbine torque upward ramping and prevent turbine over speed during turbine torque downward ramping.

While the foregoing is directed to embodiments of the present disclosure, other and further embodiments of the disclosure may be devised without departing from the basic scope thereof, and the scope thereof is determined by the claims that follow.

What is claimed is:

1. A method for stabilizing power output in a wind turbine, comprising:
    tracking a rate of change in an external reference;
    computing a feed-forward pitch angle adjustment based on a product of a compensation term in a pitch controller and the rate of change in the external reference, wherein the compensation term is a ratio of a change in pitch angle $\Delta\theta$ to a change in power output $\Delta P$ of the wind turbine, wherein $\Delta\theta$ is based on a change in the power coefficient $\Delta Cp$ of the wind turbine, and wherein $\Delta Cp$ is a function of a current pitch angle of rotor blades of the wind turbine, rotor speed of the wind turbine, and wind speed;
    computing, in the pitch controller, a feed-back pitch angle adjustment based on a measured generator speed;
    combining the feed-forward pitch angle adjustment and the feed-back angle adjustment; and
    sending the feed-forward pitch angle adjustment to the wind turbine to adjust a pitch angle of rotor blades.

2. The method of claim 1, wherein the external reference is one of external power reference and external torque reference.

3. The method of claim 2, wherein sending the feed-forward pitch angle adjustment to the wind turbine comprises:
    sending the feed-forward pitch angle adjustment through an integral controller of the pitch controller.

4. The method of claim 1, wherein computing the feed-forward pitch angle adjustment further comprises:
numerically computing $$\frac{\Delta C_p(\theta, \Omega, v)}{\Delta \theta}$$

from equation $$\frac{\Delta C_p(\theta, \Omega, v)}{\Delta \theta} \approx \frac{C_p(\theta_{t1}, \Omega, v) - C_p(\theta_{t2}, \Omega, v)}{\theta_{t1} - \theta_{t2}},$$

wherein $\theta$ denotes a current pitch angle of the rotor blades, $\Omega$ denotes rotor speed, $v$ denotes wind speed, $C_p(\theta, \Omega, v)$ indicates a power coefficient of the wind turbine as function of pitch angle, rotor speed, and wind speed, $\theta_1$ and $\theta_2$ are discrete pitch angle values closest to a current pitch angle $\theta$, $\Delta\theta$ is the change in pitch angle, and $\Delta C_P$ is a change in power coefficient.

5. The method of claim 4, wherein numerically computing $$\frac{\Delta C_p(\theta, \Omega, v)}{\Delta \theta}$$

comprises using a look-up table.

6. The method of claim 5, wherein computing the feed-forward pitch angle adjustment further comprises:
    computing the feed-forward pitch angle adjustment using equation $$\Delta \theta = \frac{2 \cdot \Delta P}{A \cdot \rho \cdot v^3 \cdot \frac{\Delta C_p(\theta, \Omega, v)}{\Delta \theta}},$$

wherein $\Delta P$ is the change in power output, $\rho$ denotes air density, and $\Delta\theta$ is the change in pitch angle.

7. The method according to claim 1, wherein the feed-forward pitch angle adjustment is computed taking into account the rotor speed ($\Omega$).

8. The method according to claim 1, wherein the feed-forward pitch angle adjustment is compensated for induction lag by filtering using a lag compensator.

9. The method of claim 1, further comprising:
    prior to sending the feed-forward pitch angle adjustment to the wind turbine, passing the feed-forward pitch angle adjustment through a saturation to ensure a rate of pitch angle adjustment is within an operational range of the wind turbine.

10. The method of claim 1, further comprising:
    prior to sending the feed-forward pitch angle adjustment to the wind turbine, passing the feed-forward pitch angle adjustment through a notch filter at a natural frequency $f_0$ of a wind turbine component to mitigate vibrations in the wind turbine component when adjusting the pitch angle.

11. A pitch controller for a wind turbine, comprising:
    a feed-forward controller configured to receive an external reference from a grid controller, track a rate of change in the external reference and generate a feed-forward pitch angle adjustment based on a product of a compensation term in a pitch controller and the rate of change in the external reference, wherein the compensation term is a ratio of a change in pitch angle $\Delta\theta$ to a change in power output $\Delta P$ of the wind turbine, wherein $\Delta\theta$ is based on a change in the power coefficient $\Delta Cp$ of the wind turbine, and wherein $\Delta Cp$ is a function of a current pitch angle of rotor blades of the wind turbine, rotor speed of the wind turbine, and wind speed, and wherein the external reference is one of external power reference and external torque reference;
    a feed-back controller configured to receive a feed-back signal from a sensor in the wind turbine and generate a feed-back pitch angle adjustment according to the feed-back signal; and
    wherein the feed-forward pitch adjustment from the feed-forward controller and the feed-back pitch angle adjustment from the feed-back controller are combined to determine a pitch angle position to control the pitch angle of the rotor blades.

12. The pitch controller of claim 11, wherein the feed-back controller comprises an integral controller, and an output of the feed-forward controller connects to an input of the integral controller of the feed-back controller.

13. The pitch controller of claim 11, wherein the feed-forward controller comprises a computer program product configured to:
track a change in the external power reference;
compute the feed-forward pitch angle adjustment according the change in the external power reference; and
send the feed-forward pitch angle adjustment to the wind turbine to adjust a pitch angle of rotor blades simultaneously with adjusting power output according to the external power reference.

14. The pitch controller of claim 11, wherein determining change in pitch angle over change in power output $$\frac{\Delta \theta}{\Delta P}$$

comprises:
applying differentiation of pitch angle θ on both sides equation $$P = \frac{1}{2} \cdot A \cdot \rho \cdot v^3 \cdot C_p(\theta, \Omega, v)$$

to obtain a term $$\frac{\Delta P}{\Delta \theta};$$

inverting the term $$\frac{\Delta P}{\Delta \theta};$$

numerically computing $$\frac{\Delta C_p(\theta, \Omega, v)}{\Delta \theta}$$

from equation $$\frac{\Delta C_p(\theta, \Omega, v)}{\Delta \theta} \approx \frac{C_p(\theta_1, \Omega, v) - C_p(\theta_2, \Omega, v)}{\theta_1 - \theta_2};$$

and
computing the feed-forward pitch angle adjustment using equation $$\Delta \theta = \frac{2 \cdot \Delta P}{A \cdot \rho \cdot v^3 \cdot \frac{\Delta C_p(\theta, \Omega, v)}{\Delta \theta}},$$

wherein θ denotes a current pitch angle of the rotor blades, Ω denotes rotor speed, v denotes wind speed, $C_p(\theta, \Omega, v)$ indicates a power coefficient of the wind turbine as function of pitch angle, rotor speed, and wind speed, $\theta_1$ and $\theta_2$ are discrete pitch angle values closest to a current pitch angle θ, Δθ is the change in pitch angle, and $\Delta C_p$ is a change in power coefficient, ρ denotes air density, and A denotes a sweeping area of the wind turbine's rotor blades.

15. The pitch controller according to claim 11, wherein the feed-forward pitch angle adjustment is computed taking into account the rotor speed (Ω).

16. The pitch controller according to claim 11, wherein the feed-forward pitch angle adjustment is compensated for induction lag by filtering using a lag compensator.

17. The pitch controller of claim 13, wherein the computer program product is further configured to:
prior to sending the feed-forward pitch angle adjustment to the wind turbine, passing the feed-forward pitch angle adjustment through a second order notch filter at a natural frequency $f_0$ of a wind turbine tower to mitigate vibrations in the wind turbine tower when adjusting the pitch angle; and
prior to sending the feed-forward pitch angle adjustment to the wind turbine, sending the feed-forward pitch angle adjustment through an integral controller of a control system of the wind turbine.

18. A wind turbine system, comprising:
a wind turbine configured to convert wind power to electrical power and provide electrical power to a power grid;
a feed-forward controller configured to receive an external reference from a grid controller of the power grid, generates a feed-forward pitch angle adjustment based on a product of a compensation term in a pitch controller and a rate of change in the external reference, wherein the compensation term is a ratio of a change in pitch angle Δθ to a change in power output ΔP of the wind turbine, wherein Δθ is based on a change in the power coefficient ΔCp of the wind turbine, and wherein ΔCp is a function of a current pitch angle of rotor blades of the wind turbine, rotor speed of the wind turbine, and wind speed, and send the feed-forward pitch angle adjustment to the wind turbine;
a feed-back controller configured to receive a feed-back signal from a sensor in the wind turbine and generate a feed-back pitch angle adjustment according to the feed-back signal; and
wherein the feed-forward pitch adjustment from the feed-forward controller and the feed-back pitch angle adjustment from the feed-back controller are combined to determine a pitch angle position to control the pitch angle of the rotor blades.

* * * * *